US006477655B1

(12) United States Patent
Delvaux et al.

(10) Patent No.: US 6,477,655 B1
(45) Date of Patent: Nov. 5, 2002

(54) SYSTEM AND METHOD TO SET PME_STATUS BIT AND WAKE UP THE SYSTEM, AND SELECTIVELY LOAD DEVICE DRIVER BY SEARCHING WHO SET THE BIT WITHOUT REQUIRING CLOCK

(75) Inventors: Marc Delvaux, Eatontown, NJ (US); Ronen Habot, Eatontown, NJ (US)

(73) Assignee: GlobespanVirata, Inc., Red Bank, NJ (US)

( * ) Notice: Subject to any disclaimer, the term of this patent is extended or adjusted under 35 U.S.C. 154(b) by 0 days.

(21) Appl. No.: 09/431,688

(22) Filed: Nov. 1, 1999

Related U.S. Application Data

(60) Provisional application No. 60/111,455, filed on Dec. 9, 1998.

(51) Int. Cl.[7] .................................................. G06F 1/26
(52) U.S. Cl. ........................ 713/323; 713/300; 713/310; 713/320
(58) Field of Search .................................. 713/300–340

(56) References Cited

U.S. PATENT DOCUMENTS

| | | | | |
|---|---|---|---|---|
| 5,905,900 A | * | 5/1999 | Combs et al. | 395/750.03 |
| 5,938,771 A | * | 8/1999 | Williams et al. | 713/310 |
| 5,999,730 A | * | 12/1999 | Lewis | 395/702 |
| 6,065,121 A | * | 5/2000 | Hobson et al. | 713/300 |

FOREIGN PATENT DOCUMENTS

JP    407302139 A  * 11/1995  ............. G06F/1/32

* cited by examiner

Primary Examiner—Thomas Lee
Assistant Examiner—Nitin C. Patel
(74) Attorney, Agent, or Firm—Thomas, Kayden, Horstemeyer & RIsley

(57) ABSTRACT

In general, a system and method for providing PCI power management support without requiring a clock is disclosed. A computer is allowed to reside in a sleep mode and receive a power management event signal from an attached peripheral device in response to an external action request from an external source, thereby waking the computer and initializing device drivers to allow the peripheral device to perform predefined functions. During initiation of the power management system, the system provides a peripheral device with a PME_Status bit. In response to an external event, the peripheral device receives an external action request from the source of the external event. The peripheral device then sets the PME_Status bit and transmits a power management event (PME) signal to a computer operating system. Upon receiving the PME signal, the computer turns back on. The computer operating system then searches all peripheral devices connected to the computer for the set PME_Status bit. Upon finding the source of the PME_Status bit, the computer initializes a device driver, which is related to the peripheral device, thereby allowing the peripheral device to function accordingly and accommodate the external action request.

20 Claims, 4 Drawing Sheets

SYSTEM AND METHOD TO SET PME_STATUS BIT AND WAKE UP THE SYSTEM, AND SELECTIVELY LOAD DEVICE DRIVER BY SEARCHING WHO SET THE BIT WITHOUT REQUIRING CLOCK

CROSS-REFERENCE TO RELATED APPLICATIONS

This application claims the benefit of U.S. Provisional Application Ser. No. 60/111,455, filed on Dec. 9, 1998, and entitled "PCI Power-Management Support Without Any Required Clock," which is incorporated by reference herein in its entirety.

FIELD OF THE INVENTION

The present invention generally relates to a system and method for providing PCI power management support without requiring a clock. More specifically, the invention is related to an integrated circuit which is capable of detecting events external to a computer, while the computer's clock is sleeping, and thereafter, internally signaling to the computer's operating system to wake up the computer system in order to provide for the external event.

BACKGROUND OF THE INVENTION

With the advancement of technology has come an increase in the complexity of computer systems along with greater demands on the required performance of clocks internal to computers. Minimum clock speed requirements for computers have increased dramatically due to the ever-present need for faster computation. Unfortunately, internal clocks use a vast amount of power during computer use that is attributed to such things as data sampling. Also, an increase in computer clock speed results in even greater power use.

As a solution to the aforementioned power expenditure problem, computer systems implement power management systems to provide energy savings. Typically, the amount of power consumed by a computer is proportional to the frequency of an internal clock, which sequences the operation of various internal components. For example, one particular component may be a central processing unit (CPU) that may perform various tasks. These tasks may include spending a large percentage of time in idle loops, waiting for input/output operations to be completed, waiting for operator input, etc. To reduce power consumption, most power management systems concentrate on reducing CPU clock speed during periods of module inactivity and during periods wherein operations performed by the modules do not require high frequencies.

Additionally, there are times during which a computer system may not be actively used, or is not actively performing a useful function. During such times, transitioning the computer system to a sleep state, or low power consumption state, helps to preserve power, while having minimum impact on the performance of the computer system.

In order to implement power management systems, some computers or computer control devices include power management software that determines when a device or system meets a predefined inactivity level. After it has been determined that the predefined inactivity level has been exceeded, the software powers down the system, either partially or fully. For instance, the predefined inactivity level might be defined as an absence of application program execution and an absence of the receipt of external event signals for a specified period of time (e.g., key strokes or mouse movement signals from a user interface, or change in the status of another device that is being monitored by the system in question, such as a peripheral device attached to the computer via a PCI slot). This manner of powering down a device when the power management software detects the predefined inactivity level may vary greatly from system to system.

In some devices, power savings may be accomplished by saving the current system context in stable storage (e.g., battery backed random access memory (RAM)), and then powering down all components of the computer system other than the RAM and the components used to detect external event signals. In other systems, especially systems where vast response to external signals is deemed to be especially important, power usage is reduced without fully powering down components most likely to be needed for responding to the external signals. Instead, for systems where vast response to external signals is deemed to be especially important, the rate of clock signals may be reduced. As an example, reducing the rate of the clock signal delivery to a data processor (i.e., CPU) greatly reduces the power consumed by the data processor, while still allowing the data processor to continue performing background tests that use a small fraction of the computer system's data processing capacity. When a qualifying external signal (i.e., one that requires restoring the system to full power) is detected, the power management software changes the rate of the clock signal delivered to the data processor back to its full, and normal rate.

Unfortunately, the aforementioned power management systems generally require a clock to be present to perform power management operation. Typically, the clock drives memory elements that store information for operating system usage.

SUMMARY OF THE INVENTION

In light of the foregoing, the invention is a system and method for providing PCI power management support without requiring a clock. The invention allows a computer to reside in a sleep mode and receive a power management event signal from an attached peripheral device in response to an external action request from an external source, thereby waking the computer and initializing device drivers to allow the peripheral device to perform predefined functions.

During initiation of the power management system, the system provides a peripheral device, which is attached to the computer, with a PME_Status bit. Upon occurrence of an external event, the peripheral device receives an external action request from the source of the external event. The peripheral device then sets the PME_Status bit and transmits a power management event (PME) signal to a computer operating system. Upon receiving the PME signal, the computer returns to a fully activated state. The computer operating system then searches all peripheral devices connected to the computer for the set PME_Status bit. Upon finding the source of the PME_Status bit, the computer initializes a device driver, which is related to the peripheral device, thereby allowing the peripheral device to function accordingly and accommodate the external action request.

The invention has numerous advantages, a few of which are delineated hereafter as examples. Note that the embodiments of the invention, which are described herein, possess one or more, but not necessarily all, of the advantages set out hereafter.

One advantage of the invention is that implementation merely requires minimal cost due to the use of very basic memory elements.

Another advantage is that it reduces global power dissipation of a circuit needed for power management support.

Other features and advantages of the present invention will become apparent to one of reasonable skill in the art upon examination of the following drawings and detailed description. It is intended that all such additional features and advantages be included herein within the scope of the present invention as defined by the claims.

BRIEF DESCRIPTION OF THE DRAWINGS

The present invention will be more fully understood from the detailed description given below and from the accompanying drawings of the preferred embodiments of the invention, which however, should not be taken to limit the invention to the specific embodiments, but are for explanation and for better understanding. Furthermore, the drawings are not necessarily to scale, emphasis instead being placed upon clearly illustrating the principles of the invention. Finally, like reference numerals in the figures designate corresponding parts throughout the several drawings.

DESCRIPTION OF THE PREFERRED EMBODIMENT

The power management system of the present invention can be implemented in hardware, software, firmware, or a combination thereof. In the preferred embodiment(s), the system is implemented in software or firmware that is stored in a memory and that is executed by a suitable instruction execution system. If implemented in hardware, as in an alternative embodiment, the system can implemented with any or a combination of the following technologies, which are all well known in the art: a discrete logic circuit(s) having logic gates for implementing logic functions upon data signals, an application specific integrated circuit having appropriate logic gates, a programmable gate array(s) (PGA), a fully programmable gate array (FPGA), etc.

Figure 1:
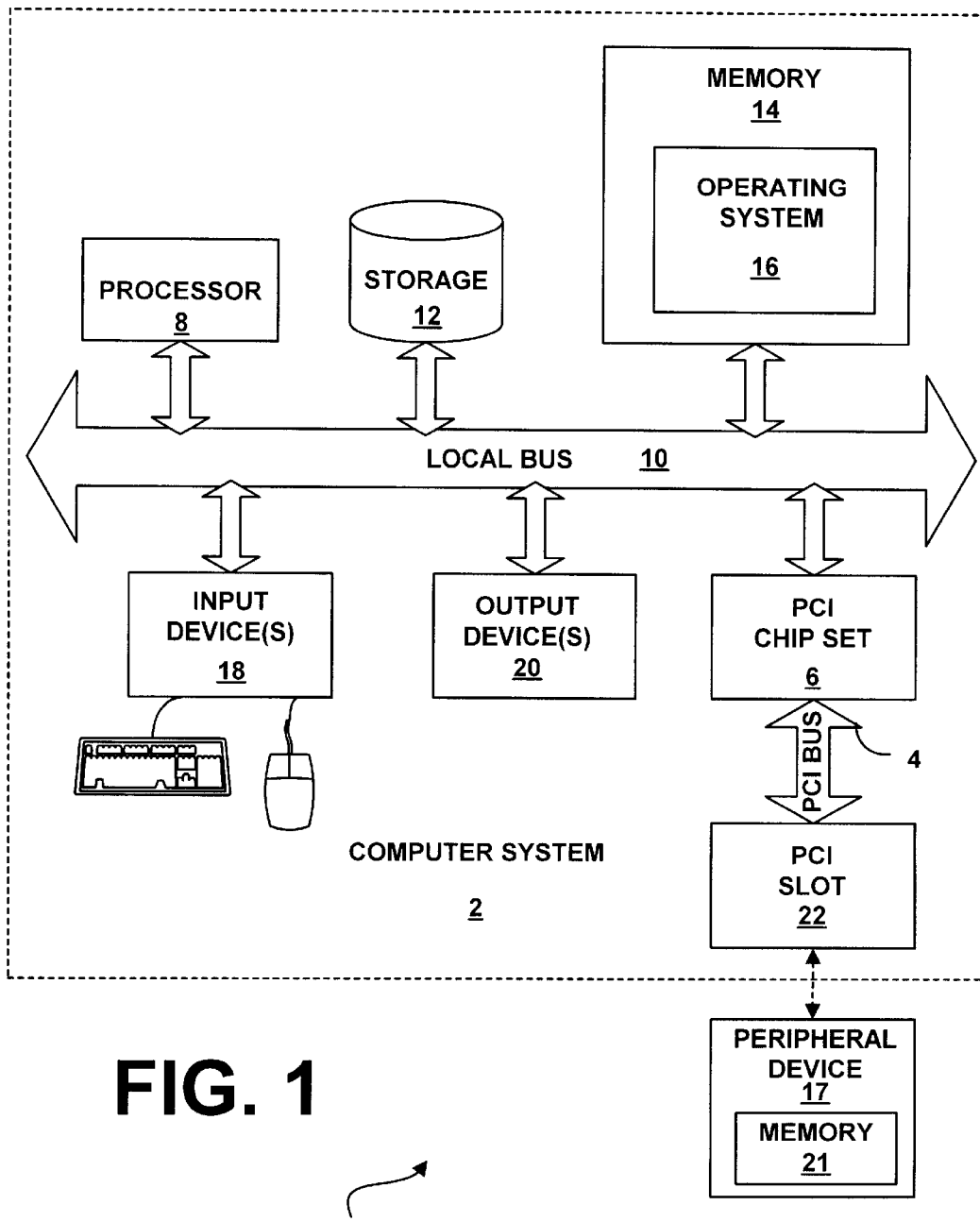
FIG. 1 is a block diagram of a computer system that employs the present power management support system.

Referring now to the drawings, wherein like reference numerals designate corresponding parts throughout the drawings, FIG. 1 illustrates a power management system 100 that includes a computer or processor based system 2 having a peripheral component interconnect (PCI) bus 4, and therefore a PCI chip set 6. The computer system 2 generally comprises a computer processor 8, a local bus 10, a storage device 12, and a computer memory 14 with an operating system 16. The computer processor 8 accepts data from computer memory 14 over the local bus 10. It should be noted that while the computer system 2 is described as having a local bus 10, an alternative dedicated path may be used.

The computer system 2 also includes an input device(s) 18 and output device(s) 20. Generally, this system 2 may run any of the number of different platforms and operating systems 16, including, but not limited to, the Unix®, WindowsNT®, or SunSolaris® operating systems. A PCI slot 22 is attached to the PCI bus 4 and provides a means for a peripheral device 17, having a memory 21, such as a network interface card (NIC), to attach to the computer system 2. The peripheral device 17 attached to the computer 2 may be any of a number of devices, such as, for example, a fax modem card, video accelerator card, or a sound card. In accordance with the preferred embodiment of the invention, the peripheral device 17 and the operating system 16 of the computer 2 logically interact, as described with reference to FIG. 2, thereby providing the present power management system 100. It should be noted that more than one peripheral device may be provided by the present power management system 100.

Figure 2:
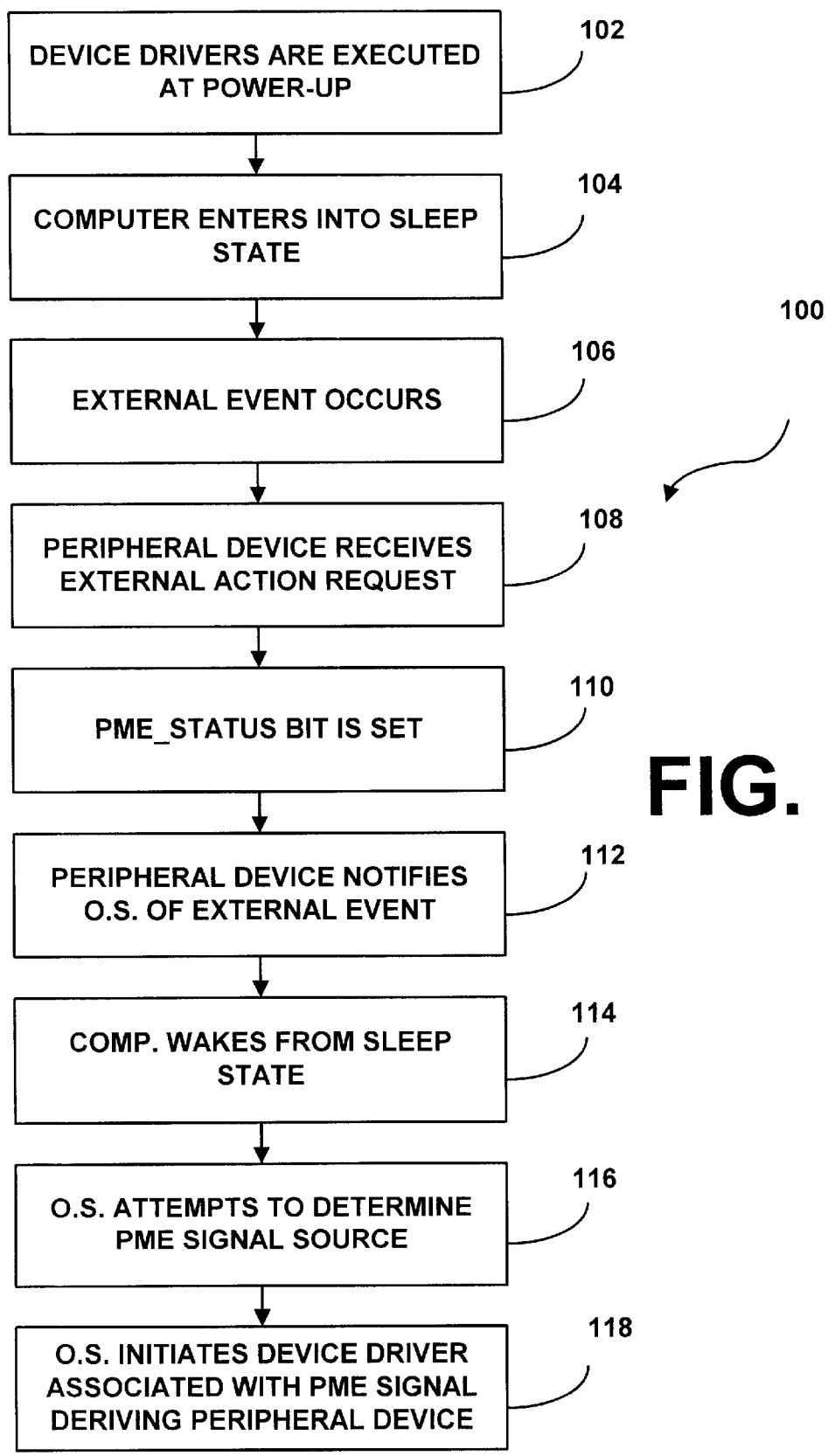
FIG. 2 is a flow chart illustrating logic performed by the present system for providing PCI power management support without requiring a clock, according to various embodiments of the present invention.

FIG. 2 is a flow chart illustrating the functionality of the power management system 100 for providing PCI power management support without requiring a clock, in accordance with the preferred embodiment of the invention. Generally, the flow chart of FIG. 2 shows the architecture, functionality, and operation of a possible implementation of the power management system. In this regard, each block represents a module, segment, or portion of code, which comprises one or more executable instructions for implementing the specified logical function(s). It should also be noted that in some alternative implementations, the functions noted in the blocks may occur out of the order noted in FIG. 2. For example, two blocks shown in succession in FIG. 2 may in fact be executed substantially concurrently or the blocks may sometimes be executed in the reverse order, depending upon the functionality involved, as will be further clarified hereinbelow.

As shown by block 102, at the power-up stage of the computer 2, device drivers, which have been previously stored in the storage device 12 of the computer 2, are loaded into the memory 14 and executed by the processor 8. As is well known to one of reasonable skill in the art, device drivers are controlled and supervised by the computer's operating system 16, which as previously mentioned, is located in the computer memory 14 and executed by the processor 8. The device drivers contain functionality pertaining to the peripheral devices 17 that are attached to the computer 2 via the PCI slot 22. Generally, the device drivers enable the computer system 2 to interface with the peripheral device. As such, the device drivers provide for such features as the data sampling speed of peripheral devices 17, flow control, data control, or peripheral device 17 status. Further, the device drivers specify functions to be performed when a source, external to the computer 2, such as a fax modem card having a PCI interface, request a responding action to be performed by the computer 2, as defined by a device driver. As an example, a responding action may include, but is not limited to, a request for the computer's operating system 16 to provide the fax modem card with appropriate power and clock, for purposes of receiving an incoming fax.

Alternatively, the external request may be derived from a device external to a peripheral device 17, which is attached to the computer 2. As such, the external request would be received by the peripheral device 17, which would, in turn, require a responding action to be performed by the computer 2, as defined by a device driver.

During execution of the device drivers, each peripheral device 17 is individually identified by a PME_Status bit, which is stored in a configuration register space, located in the peripheral device memory 21. The PME_Status bit is a read bit that is continuously polled by the device driver software.

In accordance with the preferred embodiment of the invention, as shown by block 104, the computer 2 enters a sleep state after a period of peripheral device 17 inactivity. Sleep states may differ from one computer to another in accordance with specific requirements of the computer user, as specified by the power management software. In accordance with the preferred embodiment of the invention, the sleep state provides a reduction in the clock speed of the computer 2 such that the computer processor 8 is allowed to continue performing background tasks, such as monitoring mouse movement, or running screen saver, that use a small fraction of the computer system's processor capacity. It should be noted that the computer 2 may employ numerous internal clocks, as opposed to a single clock. In such a case, the power management software may include logic to reduce the clock speed of each individual internal clock accordingly. During the sleep state, the clock signal is not transmitted to peripheral devices 17 connected to the computer 2. This further reduces power consumption by the computer 2. Alternatively, the clock may be completely turned off.

To trigger the sleep state, power management software is loaded into the computer memory 14, wherein the power management software is capable of detecting inactivity of peripheral devices 17 connected to the computer 2. The period of peripheral device 17 inactivity is predefined and user specified via the power management software.

As shown by block 106, while the computer is in a sleep state, an external event may occur that is perceived by a peripheral device attached to the computer 2. As an example, an external event may be a phone ring, received from a phone jack located separately from the computer 2, and perceived by a fax modem card that is connected to the computer 2 via the PCI slot 22.

Thereafter, as depicted in block 108, in response to the external event, the peripheral device 17 receives an external action request from the source of the external event. The external action request specifies to a peripheral device 17, such as the fax modem of the present example, that a response is needed by the peripheral device 17. In response to the external action request, the PME_Status bit is set, thereby signifying that there has been a peripheral device 17 request (block 110).

As shown by block 112, after the peripheral device 17 has received the external action request, the peripheral device 17 notifies the computer's operating system 12 that an external event involving power management has occurred. In accordance with the preferred embodiment of the invention, notification is performed by a power management event (PME) signal. The PME signal notifies the computer's operating system 16 of the external event by transmitting from the peripheral device 17, via the PCI bus 4, to the PCI chip set 5, which notifies the PCI chip set 5 that a power management event has occurred. The PCI chip set 6, in turn, notifies the operating system 16 of the external event.

As depicted by block 114, in response to receiving the PME signal, the computer system 2 wakes up from its sleep state, such that the computer system 2 functions as it did before the sleep state. As shown in block 116, the operating system 16 then attempts to determine the source of the PME signal. In determining the source of the PME signal the operating system 16 requests each device driver, associated with a peripheral device 17 attached to the computer 2 via PCI slots 22, to poll its correlating peripheral device 17. During polling, each device driver searches the associated peripheral device 17 for a set PME_Status bit. The device driver polls these bits in each peripheral device's 17 predefined location within the configuration space. If the PME_Status bit is set, this signifies that the associated peripheral device 17 is signaling a power management event.

As noted by block 118, when the operating system 16 identifies which peripheral device 17 transmitted the PME signal, the operating system 16 initiates the device driver associated with the peripheral device 17 to perform associated predefined functions as specified by the device driver. As previously mentioned, the functions to be performed by and for the peripheral device 17 are previously loaded by the device drivers in the computer processor 8, which is managed by the operating system 16.

Among the many functions defined by the device drivers, the device drivers also define clock requirements, which are to be performed by the PCI chip set 6. As such, in accordance with the device driver loaded by the operating system 16, the PCI chip set 6 initiates the internal clock, such that the peripheral device 17 is capable of performing the predefined functions according to the associated device driver.

Figure 3:
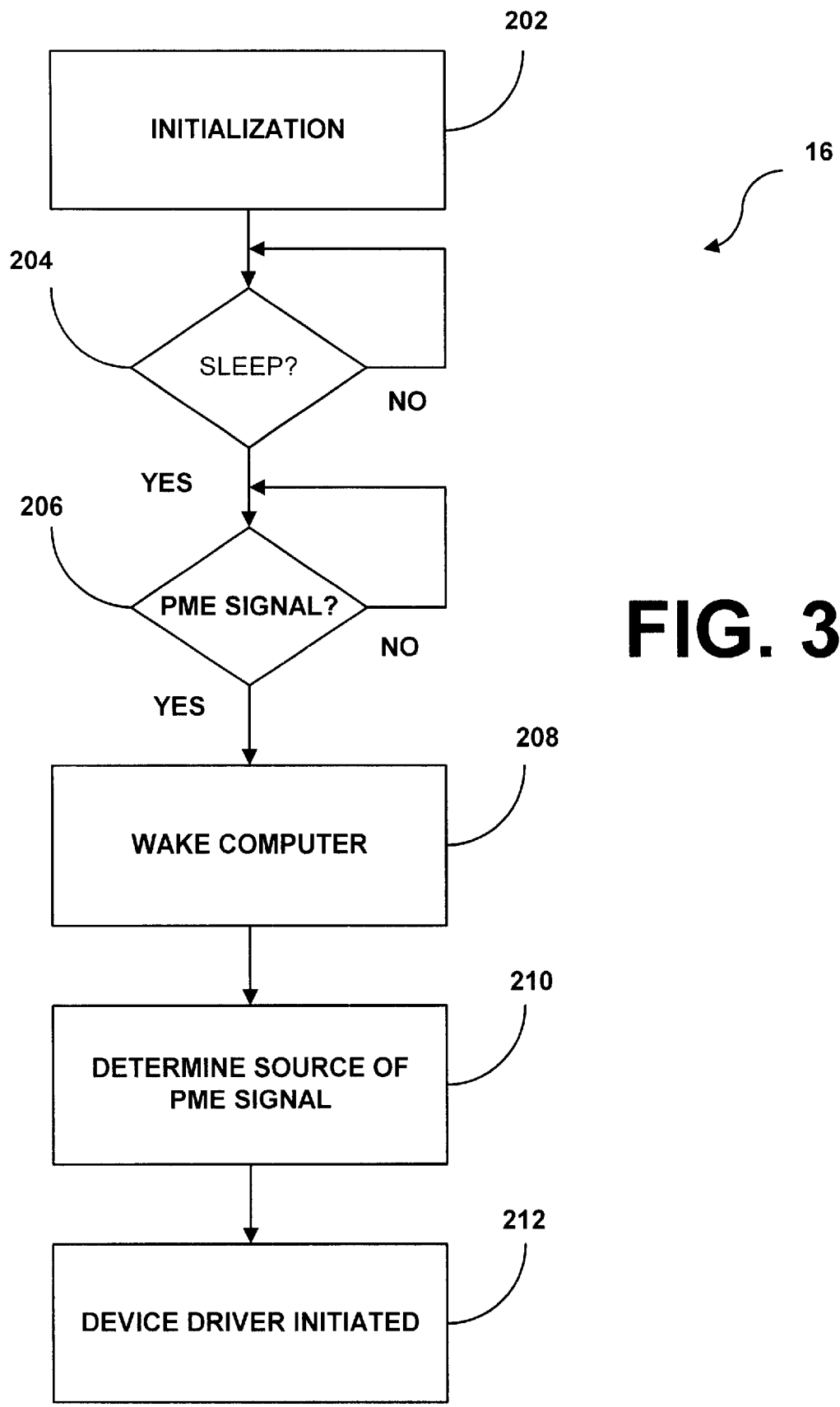
FIG. 3 is a flow chart illustrating logic performed by the operating system of FIG. 1.

FIG. 3 is a flow chart illustrating logic performed by the operating system 16 of FIG. 1. As shown by block 202, in accordance with the preferred embodiment of the invention, the computer is first initialized. During initialization of the computer 2, the operating system 16 loads device drivers, previously stored in the storage device 12, into the memory 14 for execution by the processor 8. During execution of the device drivers, the operating system 16 assigns a PME_Status bit, stored in a configuration register space, located in the peripheral device memory 21, to peripheral devices 17 that have been removably attached to the computer 2.

As shown by block 204, the operating system 16 then determines whether the computer 2 should enter a sleep state based on a predefined period of peripheral device 17 inactivity. Assuming that the computer 2 enters a sleep state, the operating system 16 moves to block 206 to wait for a PME signal. As shown by block 208, if the PME signal is not received by the operating system 16 in block 206, the computer 2 remains in a sleep state. Upon receiving a PME signal in block 206, the operating system 16 proceeds to block 208 and wakes the computer 2. As shown by block 210, the operating system 16 then attempts to determine the source of the PME signal by polling, via use of device drivers, peripheral devices 17 that are removably connected to the computer 2 for a set PME_Status bit. When the source of the PME signal has been found, the operating system 16 initiates the device driver associated with the peripheral device that transmitted the PME signal. (block 212).

Figure 4:
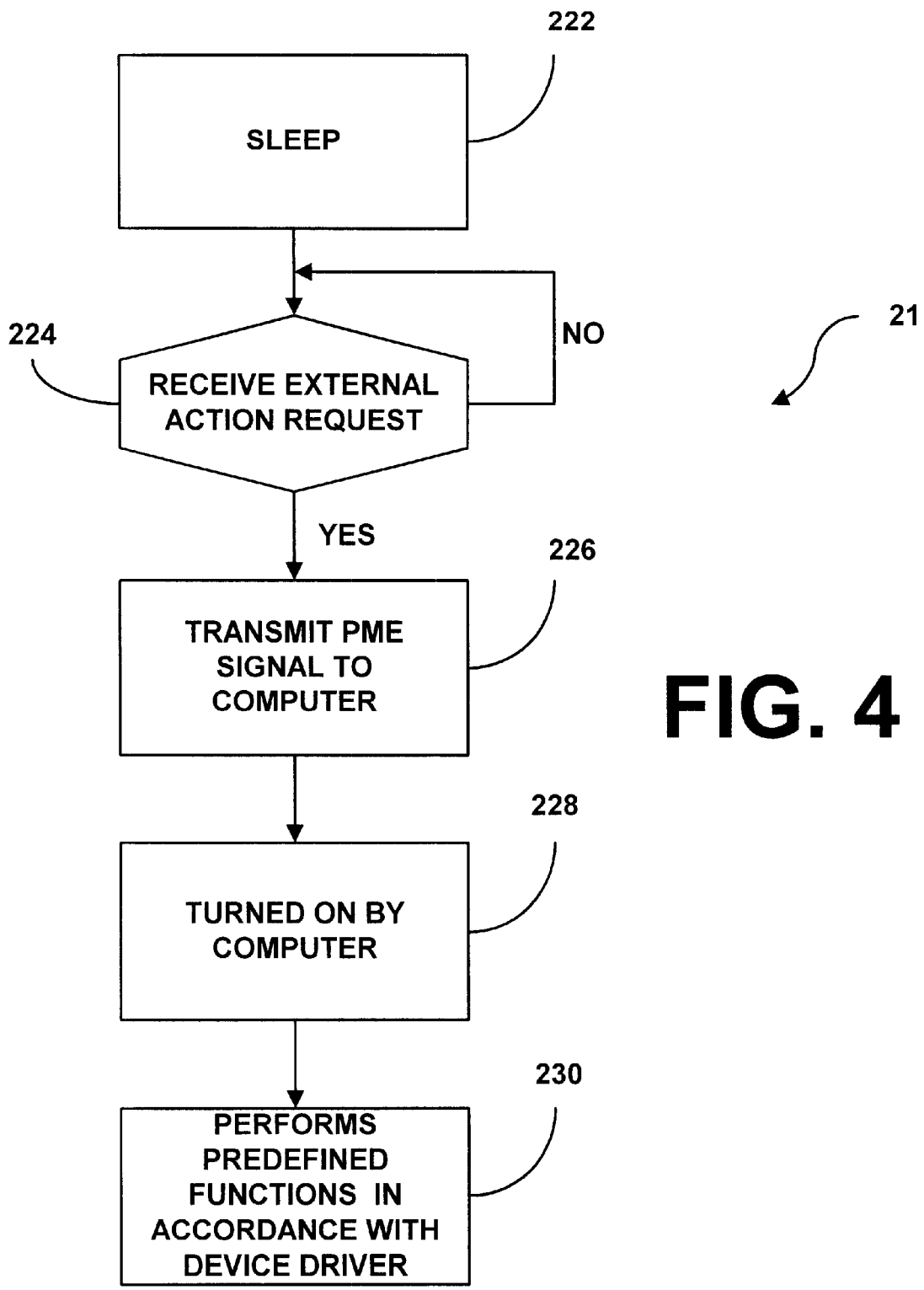
FIG. 4 is a flow chart illustrating logic performed by the peripheral device of FIG. 1.

FIG. 4 is a flow chart illustrating logic implemented in the peripheral device 17. The logic is implemented by the peripheral device 17 of FIG. 1 after the computer 2 enters a sleep mode. In accordance with the preferred embodiment of the invention, when the computer 2 enters a sleep mode, it turns off power to the peripheral device 17 that is removably attached to the computer 2, thereby also placing the peripheral device 17 into a sleep state (block 222).

In block 224 the peripheral device 17 remains in a sleep state until it receives an external action request. In response to receiving the external action request, in block 226 the peripheral device 17 transmits the PME signal to the operating system 16 of the computer 2. Then, in block 228, the peripheral device 17 is turned on by the computer 2. As shown by block 230, once the peripheral device 17 is turned on, it performs functions predefined by device drivers executed by the computer processor 8 and initiated by the operating system 16 as previously described with reference to FIG. 2 (block 230).

In accordance with a first alternative embodiment of the invention, a separate clock source may be located on a peripheral device 17 that supplies the computer system 2 with an external clock, even if the computer's internal clock is off (i.e., D3 Cold State). Based upon this external clock, the computer 2 is capable of sampling external events and detecting a PME.

In a second alternative embodiment of the invention, the computer 2 includes functionality to enable or disable the power management features when required by a particular peripheral device 17. This is accomplished by including a PME_Enable bit that is stored in the configuration register space, located in the peripheral device memory 21. Similar to the PME_Status bit, during execution of the device drivers, each peripheral device 17 is associated with a particular PME_Enable bit.

In accordance with the second alternative embodiment, prior to a PME occurring, the device driver associated with a peripheral device 17 sets the PME_Enable bit. If the PME_Enable bit is set prior to a PME occurring, the computer 2 recovers from sleep state as described with reference to the preferred embodiment of the invention. If however, the PME_Enable bit is not set by the device driver prior to a PME occurring, the associated peripheral device 17 will not transmit a PME signal to the computer, and therefore will not be part of the power management scheme. As such, the computer will not recover from the sleep state if the PME_Enable bit associated with the peripheral device 17 is not set.

It should be emphasized that the above-described embodiment of the present invention, particularly any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention and protected by the following claims.

What is claimed is:

1. A system for providing PCI power management support, without requiring a clock, comprising:
    a processor based system having an external slot;
    a peripheral device connected to said external slot, capable of receiving an external request from an external device, wherein a PME_Status bit is set by said peripheral device in response to said external request;
    an operating system, located in said processor based system, capable of waking said processor based system from a sleep mode in response to a power management event (PME) signal received from said peripheral device, and searching said peripheral device for said PME_Status bit; and
    a device driver, loaded into said processor based system, capable of being initiated in response to said peripheral device having a set PME_Status bit.

2. The system of claim 1, wherein said sleep mode is further defined by said processor based system turning off power to said peripheral device.

3. The system of claim 1, wherein said sleep mode is further defined by said processor based system deactivating an internal clock.

4. The system of claim 3, wherein said peripheral device is further defined by an external clock located internal to said peripheral device, wherein said external clock is capable of providing a clock signal to said sleeping processor based system so that said device driver is capable of assisting said peripheral device in performing predefined functions.

5. The system of claim 1, further comprising a PME_Enable bit which is capable of determining whether transmission of said PME signal to said processor based system will waken said processor based system.

6. The system of claim 1, wherein said peripheral device is a network interface card.

7. The system of claim 1, wherein said PME signal is transmitted to said processor based system in response to said external request.

8. The system of claim 1, wherein said external slot is a PCI slot.

9. The system of claim 1, wherein said processor based system is a personal computer having a PCI bus.

10. The system of claim 1, wherein said sleep mode is entered into by said processor based system after a predefined time.

11. A method of providing PCI power management support, without requiring a clock, comprising the steps of:
    powering up a processor based system;
    said processor based system entering into a sleep mode;
    setting a PME_Status bit in response to receiving an external event signal;
    waking said processor based system in response to said external event signal;
    determining a source of said external event signal by searching for a set PME_Status bit; and
    initializing a device driver associated with said source of said external event signal.

12. The method of claim 11, wherein said sleep mode is further defined by said processor based system turning off power to external devices attached to said processor based system.

13. The method of claim 12, wherein said external device is a is a network interface card.

14. The method of claim 11, wherein said step of waking said processor based system is further defined by a peripheral device receiving said external event signal and, in response, transmitting a power management event (PME) signal to said processor based system.

15. The method of claim 11, wherein said step of powering up said processor based system is further defined by the step of said processor based system loading said device driver.

16. The method of claim 14, further comprising the step of setting a PME_Enable bit which is capable of determining whether transmission of said PME signal to said processor based system will waken said processor based system.

17. The method of claim 11, wherein said step of entering into a sleep mode is further defined by turning off a clock, internal to said processor based system.

18. The method of claim 17, further comprising the step of providing a clock signal to said sleeping processor based system so that said device driver is capable of being initialized.

19. A system for providing PCI power management support to a processor based system having an external slot, without requiring a clock, comprising:
    a means for receiving an external request from an external device, wherein a PME_Status bit is set by said means for receiving in response to said external request;
    a means for waking said processor based system from a sleep mode in response to a power management event (PME) signal received from said means for receiving, and searching said means for receiving for said PME_Status bit; and a device driver, loaded into said processor based system, capable of being initiated in response to said means for receiving having a set PME_Status bit.

20. The system of claim 19, wherein said sleep mode is further defined by said processor based system turning off power to said means for receiving.

* * * * *

UNITED STATES PATENT AND TRADEMARK OFFICE
CERTIFICATE OF CORRECTION

PATENT NO.   : 6,477,655 B1   Page 1 of 1
DATED        : November 5, 2002
INVENTOR(S)  : Delvaux et al.

It is certified that error appears in the above-identified patent and that said Letters Patent is hereby corrected as shown below:

<u>Column 2,</u>
Line 15, after "where," delete "vast" and replace with -- fast --
Line 19, after "where," delete "vast" and replace with -- fast --

<u>Column 3,</u>
Line 45, after "can," insert -- be --
Line 51, after "a," delete "fully" and replace with -- field --

Signed and Sealed this

Fourth Day of March, 2003

JAMES E. ROGAN
*Director of the United States Patent and Trademark Office*